United States Patent [19]

Schlichting et al.

[11] 4,024,204

[45] May 17, 1977

[54] ANTISTATIC POLYBUTYLENE TEREPHTHALATE MOLDING COMPOSITIONS CONTAINING ALKOXYLATED POLYAMIDE

[75] Inventors: Karl Schlichting, Bobenheim-Roxheim; Ludwig Beer, Ludwigshafen; Wolfgang Seydl, Frankenthal, all of Germany

[73] Assignee: BASF Aktiengesellschaft, Ludwigshafen, Germany

[22] Filed: June 30, 1975

[21] Appl. No.: 591,416

[30] Foreign Application Priority Data

July 31, 1974 Germany .......................... 2436871

[52] U.S. Cl. .................. 260/857 PE; 260/857 PG
[51] Int. Cl.² ......................................... C08L 77/00
[58] Field of Search ................ 260/857 PE, 857 PG

[56] References Cited

UNITED STATES PATENTS 3,903,042  6/1974  Gall ............................. 260/857 PE

FOREIGN PATENTS OR APPLICATIONS 46-37675  5/1971  Japan
1,211,118  11/1970  United Kingdom

*Primary Examiner*—Paul Lieberman
*Attorney, Agent, or Firm*—Keil, Thompson & Shurtleff

[57] ABSTRACT

Polybutylene terephthalate molding compositions containing from 0.5 to 20% by weight, based on the polyester, of an alkoxylated polyamide finely distributed therein to reduce the tendency of the polyester to electrification.

2 Claims, No Drawings

ANTISTATIC POLYBUTYLENE TEREPHTHALATE MOLDING COMPOSITIONS CONTAINING ALKOXYLATED POLYAMIDE

This invention relates to polyester molding compositions based on polybutylene terephthalate and having a reduced tendency to electrification.

Polybutylene terephthalate is becoming increasingly significant as a material for special purposes since, for example, it is much simpler to use in thermoplastic techniques than other saturated polyesters. For example, polybutylene terephthalate may, unlike polyethylene terephthalate, be injection-molded at very low mold temperatures of from about 30° to 60° C to form highly crystalline and dimensionally stable moldings. Removal of the injection moldings from the molds has no problems, since the high rate of crystallization of polybutylene terephthalate, even at low temperatures, prevents sticking. This makes it possible to produce moldings at a very high rate (short cycle times). Moldings made of polybutylene terephthalate are characterized by good resistance to chemicals and low water absorption. They are also characterized by excellent mechanical properties such as high degrees of toughness and rigidity and by high surface hardness and good surface characteristics.

However, when processing and using polybutylene terephthalate, the surface of the molding compositions may become very dirty, this being highly unpleasant when handling such moldings and also in some cases having a very detrimental effect on the end-use benefits thereof. This dirt is caused by the attraction of dust particles from the atmosphere to the electrostatically charged polybutylene terephthalate molding compositions.

Furthermore, it is known that such highly electrified surfaces of moldings constitute a marked fire and explosion hazard should such moldings come into contact with flammable gases or liquids. It is therefore an object of the invention to provide polybutylene terephthalate molding compositions which show a reduced tendency to electrification.

We have found that polybutylene terephthalate molding compositions, for example in the form of injection moldings or sheeting, have favorable antistatic properties when they contain, based on the amount of polymer, from 0.5 to 20% by weight of an alkoxylated polyamide finely distributed therein.

The molding compositions of the invention, consisting of a polybutylene terephthalate and an alkoxylated polyamide finely distributed therein, are distinguished by very good antistatic properties. In particular, the tendency to attract dust onto the surface of the moldings is greatly reduced. In addition, the antistatic effect of the additive is of long duration, since loss of the alkoxylated polyamide introduced as antistatic agent, for example by exudation, is not possible.

Furthermore, the polybutylene terephthalate molding compositions of the invention show very good processing properties equal to those of the unmodified polybutylene terephthalate and are also characterized by good mechanical properties. For example, injection molding at low mold temperatures of from about 30° to 60° C produces highly crystalline and thus dimensionally stable shaped articles. The polybutylene terephthalate molding compositions containing alkoxylated polyamide are not degraded during thermoplastic processing. The only result is a slight drop in solution viscosity. Thus the molding compositions of the invention have mechanical properties which are similar to those of unmodified polybutylene terephthalate, particularly as regards their high toughness, strength and elongation values. The color of these molding compositions is virtually the same as that of unmodified polybutylene terephthalate.

The alkoxylated polyamides used as antistatic agents may be prepared by conventional methods. Ethylene oxide and/or propylene oxide are reacted with polyamides under pressure at elevated temperatures and, if necessary, in the presence of a solvent. In the alkoxylated polyamides, the alkylene oxides are reacted with the polyamides in a ratio of from 0.5:1 to 100:1 and preferably from 1:1 to 50:1, by weight.

Examples of polyamides from which the alkoxylated polyamides suitable for use as antistatic agents may be prepared are polycondensates of lactams of from 6 to 12 carbon atoms such as caprolactam, capryllactam, lauryllactam and conventional polycondensates of dicarboxylic acids and diamines prepared using adipic acid, azelaic acid, sebacic acid, dodecano dioic acid and hexamethylenediamine, octamethylenediamine or bis-(4-aminocyclohexyl)-methane for example. Specific examples are nylon-6,6, nylon-6,9, nylon-6,10 and nylon-6,12. The polyamides may be used both in the form of homopolyamides and copolyamides.

We prefer to render the polybutylene terephthalate molding compositions antistatic by the use of an alkoxylated polycaprolactam.

The polyester molding compositions which have been rendered antistatic in accordance with the present invention contain polybutylene terephthalate which may or may not have been modified with up to 20% molar of other dicarboxylic acids or alcohols. Examples of suitable modifiers are aliphatic dicarboxylic acids of up to 20 carbon atoms and cycloaliphatic or aromatic dicarboxylic acids having 1 or 2 aromatic rings. Specific examples are adipic acid, sebacic acid, cyclohexano dioic acid, isophthalic acid and naphthalene dioic acid.

Suitable alcoholic modifying agents are, in particular, aliphatic and cycloaliphatic glycols of from 2 to 10 carbon atoms, for example ethylene glycol, propylene glycol, hexanediol-1,6, neopentyl glycol, diethylene glycol and 1,4-bishydroxymethylcyclohexane and also bisphenols, substituted bisphenols and their reaction products with alkylene oxides.

To improve the physical properties, it may be advantageous to cause small amounts of trifunctional and polyfunctional cross-linkers such as trimethylolpropane or trimesic acid to be condensed into the polybutylene terephthalate.

The polybutylene terephthalate used in the preparation of the molding compositions of the invention usually has a relative viscosity of from 1.3 to 1.8 and preferably from 1.5 to 1.7. The relative viscosity is that determined on a 0.5% solution at 25° C in a 3:2 mixture of phenol and o-dichlorobenzene with the aid of an Ubbelohde viscometer.

In addition to the alkoxylated polyamides, the polyester molding compositions of the invention may contain reinforcing agents such as glass fibers or mineral fillers such as asbestos, chalk and talcum and also other additives such as dyes, pigments, stabilizers to counteract thermal, thermooxidative and ultraviolet damage and lubricants and processing auxiliaries ensuring trouble-free injection molding or extrusion, provided these additives do not affect the antistatic properties of the molding compositions.

The polybutylene terephthalate molding compositions of the invention showing a reduced tendency to electrification are preferably prepared by mixing granules of polybutylene terephthalate with a powder or granules of the alkoxylated polyamides followed by melting and homogenization in an extruder or injection molding machine so as to cause the alkoxylated polyamide to be present in the molding compositions in a finely dispersed form. Another preferred method is to introduce the alkoxylated polyamides to the condensation plant immediately after termination of polycondensation.

Assessment of the electrostatic properties of the molding compositions of the invention was effected by measuring the discharge occurring after contactless charging of injection-molded specimens in a corona field. The electrostatic charge is taken to be the amount of negative charge carriers which are present on the earthed specimen immediately after passing through a corona. The charge is measured with reference to the field established by the charge carriers.

COMPARATIVE TEST A

Granules of polybutylene terephthalate having a relative viscosity of 1.66 were injection-molded to round discs having a diameter of 119 mm and a thickness of 4 mm. Special care was taken to ensure that the specimens were not contaminated by oil, parting agents and the like. Touching of the surfaces with the fingers was also avoided. The relative solution viscosity of the round discs was 1.64. Before testing, the injection moldings were stored under standard conditions of temperature and relative humidity (23° C, 50% r.h. according to DIN 50,014) for at least 24 hours.

Measurement of discharge was carried out using a charging device and an instrument for measuring the field strength. The charging device, a copper wire electrode (length 140 mm, thickness 0.25 mm), was placed at a distance of 10 mm from the surface of the specimen. The electrical field strength was measured with a non-contact, wattless gaging apparatus.

The initial field strength $E_0$, i.e. the field strength produced by the charges of the surface of the specimen at the end of the charging operation and the beginning of measurement at time $t_o$, the residual field strength after 10 minutes $E_{10}$ and the half-value time were read off from the discharge curves and the relative discharge value $W_{rel(10)}$ was calculated. Measurement was carried out on 10 specimens. The results of measurement (average values) are listed in the table below. In the case of the unmodified polybutylene terephthalate, the relative discharge value is 14.

EXAMPLE 1

3000 g of granules of polybutylene terephthalate having a relative viscosity of 1.652 were thoroughly mixed with 210 g of exthoxylated polycaprolactam prepared from 1 part by weight of polycaprolactam and 3.6 parts by weight of ethylene oxide, and the mixture was melted and homogenized in an extruder and granulated after passing through a water bath. The granules were well dried and then injection-molded to specimens as described in Comparative Test A (relative viscosity of specimens 1.63). The discharge curves were plotted for 10 of the resulting round discs. The relative discharge value was 72.

COMPARATIVE TEST B

Following the procedure described in Example 1, 300 g of polyethylene terephthalate (relative viscosity 1.38) were coextruded with 225 g of ethoxylated polycaprolactam (polyamide : ethylene oxide =1:3.6) and injection-molded to round discs measuring 119×4 mm and having a relative viscosity of 1.24. Evaluation of the discharge curves plotted for 10 specimens gave a relative discharge value $W_{rel(10)}$ of 22.

EXAMPLES 2 and 3

In two further tests, 3.0 kg of polybutylene terephthalate granules having a relative viscosity of 1.665 were thoroughly mixed with 150 and 105 g respectively of ethoxylated polycaprolactam prepared from 1 part of polycaprolactam and 3.6 parts of ethylene oxide, and the mixture was extruded and converted to specimens. The relative discharge values were 61 and 59 respectively. The results of measurement are listed in the Table below.

| | Ingredients of molding compositions | | $E_o$ | $E_{10}$ | | $t_h$ |
|---|---|---|---|---|---|---|
| | Polyester | ethoxylated polycaprolactam | (volts/cm) | (volts/cm) | $W_{rel(10)}$ | (sec) |
| Test A | 100 parts of PBTP | — | 3690 | 3160 | 14 | 600 |
| Test B | 93.1 parts of PETP | 6.9 parts | 3375 | 2660 | 22 | 600 |
| Example 1 | 93.5 parts of PBTP | 6.5 parts | 7860 | 2240 | 72 | 126 |
| Example 2 | 95.2 parts of PBTP | 4.8 parts | 4470 | 1725 | 61 | 276 |
| Example 3 | 96.6 parts of PBTP | 3.4 parts | 6900 | 2850 | 59 | 238 |

PBTP = polybutylene terephthalate
PETP = polyethylene terephthalate
$E_o$ = initial field strength in volts/cm at time $t_o$
$E_{10}$ = residual field strength in volts/cm at time $t_{10}$ ($t_{10} = t_o + 10$ minutes)
$t_H$ = half-value time in seconds
$W_{rel(10)}$ = relative discharge value = $\frac{E_o - E_{10}}{E_o} \cdot 100$
All values given are averages of 10 separate measurements.

We claim:
1. Polybutylene terephthalate molding compositions showing a reduced tendency to electrification which comprises polybutylene terephthalate having a relative viscosity of from 1.3 to 1.8 as determined on a 0.5% solution at 25° C in a 3:2 mixture of phenol and o-dichlorobenzene, said polybutylene terephthalate containing from 0.5 to 20% by weight, based on the weight of polyester, of an alkoxylated polyamide finely dispersed therein, wherein said alkoxylated polyamide is the reaction product of monomeric alkylene oxides with polyamides in the ratio of 0.5:1 to 100:1, by weight.
2. Polybutylene terephthalate molding compositions as set forth in claim 1, wherein the alkoxylated polyamide is an ethoxylated polycaprolactam.

* * * * *